United States Patent
Al-Yami et al.

(10) Patent No.: US 11,840,660 B2
(45) Date of Patent: Dec. 12, 2023

(54) CEMENT SLURRIES, CURED CEMENT AND METHODS OF MAKING AND USE THEREOF

(71) Applicant: Saudi Arabian Oil Company, Dhahran (SA)

(72) Inventors: Abdullah Al-Yami, Dhahran (SA); Mohammed Alawami, Al Qatif (SA); Pratyush Singh, Dhahran (SA); Vikrant Wagle, Dhahran (SA); Husain A. Buwaidi, Dhahran (SA); Ahmad A. Omair, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/553,100

(22) Filed: Dec. 16, 2021

(65) Prior Publication Data

US 2023/0193111 A1   Jun. 22, 2023

(51) Int. Cl.
| | |
|---|---|
| *C09K 8/487* | (2006.01) |
| *C04B 28/02* | (2006.01) |
| *C04B 24/28* | (2006.01) |
| *C04B 14/30* | (2006.01) |
| *E21B 33/14* | (2006.01) |
| *C04B 14/06* | (2006.01) |
| *C04B 103/46* | (2006.01) |
| *C04B 103/40* | (2006.01) |
| *C04B 103/20* | (2006.01) |

(52) U.S. Cl.
CPC .............. *C09K 8/487* (2013.01); *C04B 14/06* (2013.01); *C04B 14/30* (2013.01); *C04B 24/281* (2013.01); *C04B 28/02* (2013.01); *E21B 33/14* (2013.01); *C04B 2103/20* (2013.01); *C04B 2103/408* (2013.01); *C04B 2103/46* (2013.01)

(58) Field of Classification Search
CPC ......... C09K 8/487; C04B 14/06; C04B 14/30; C04B 24/281; C04B 28/02; C04B 2103/20; C04B 2103/408; C04B 2103/46; E21B 33/14

See application file for complete search history.

(56) References Cited

U.S. PATENT DOCUMENTS

| | | | |
|---|---|---|---|
| 9,550,933 | B2 | 1/2017 | Chatterji et al. |
| 10,533,123 | B2 | 1/2020 | Kulkarni et al. |
| 2014/0262269 | A1 | 9/2014 | Watters et al. |
| 2016/0046853 | A1* | 2/2016 | Chatterji ............... E21B 33/138 166/292 |
| 2020/0123056 | A1* | 4/2020 | Würmli ................. C04B 24/121 |

FOREIGN PATENT DOCUMENTS

WO      2016111674 A1      7/2016

* cited by examiner

*Primary Examiner* — Crystal J. Lee
(74) *Attorney, Agent, or Firm* — DINSMORE & SHOHL LLP

(57) ABSTRACT

Cement slurries, cured cements, and methods of making cured cement and methods of using cement slurries have, among other attributes, an extended thickening time, leading to improved retardation, flowability, and pumpability and may be used, for instance, in the oil and gas drilling industry. The cement slurry includes water, microfine cement material, and bisphenol-F diglycidyl ether resin.

20 Claims, No Drawings

CEMENT SLURRIES, CURED CEMENT AND METHODS OF MAKING AND USE THEREOF

TECHNICAL FIELD

Embodiments of the present disclosure generally relate to cement slurries and methods of making and using cement slurries and to cure cements and methods of making cured cement. Specifically, embodiments of the present disclosure relate to cement slurries and cured cements and methods of making and using cement slurries and cured cements.

BACKGROUND

Cement slurries are used in the oil and gas industries, such as for cementing in oil and gas wells. Primary, remedial, squeeze, and plug cementing techniques can be used to place cement sheaths in an annulus between casing and well formations, for well repairs, well stability, and for well abandonment (sealing an old well to eliminate safety hazards). These cement slurries must be able to consistently perform over a wide range of temperatures and pressures, in the presence of certain corrosive chemical species, and under challenging mechanical conditions, as oil and gas wells can be located in a multitude of diverse locations. A cement slurry may be used in conditions less than 32° F. in freezing permafrost zones, and in temperatures exceeding 400° F. in geothermal wells and must be able to properly set under an assortment of conditions.

Proper hardening of a cement slurry can be vital to the strength and performance properties of the cured cement composition. However, conventional cement solutions may gel quickly due to the fast thickening time of the slurry, leading to poor flowability and creating concerns when handling or pumping the cement, as uniform placement of the slurry can be quite difficult. Moreover, cement slurries are often incompatible with other fluids that may be present in the casing or the wellbore wall, such as drilling fluids, and prolonged contact could cause the cement slurry to gel, preventing proper placement and removal of the cement. Cement slurries with an extended thickening time allow for more accurate and precise placement of the cement.

SUMMARY

Accordingly, there is an ongoing need for cement slurries having good flowability and pumpability with improved retardation and an extended thickening time to avoid gelation issues. The present embodiments address these needs by providing cement slurries and methods of making and using cement slurries that have improved rheology and retardation.

In one embodiment, a cement slurry comprises water, microfine cement material, and bisphenol-F diglycidyl ether resin.

In another embodiment, a cement slurry comprises water, microfine cement material, from 10 to 20 wt. % by weight of cement (BWOC) bisphenol-F diglycidyl ether resin, from 40 to 60 wt. % BWOC manganese tetroxide, from 25 to 50 wt. % BWOC silica flour, from 0.2 to 0.5 wt. % BWOC dispersant, from 0.05 to 1.0 wt. % BWOC retarder, from 25 to 50 wt. % BWOC temperature control additive, and from 1 to 5 wt. % BWOC fluid loss additive; wherein: the cement slurry has a API fluid loss of less than 50 cc/30 minutes at 190° F.; the cement slurry has a viscosity at 300 rpm and 190° F. of greater than 20 cP and less than 45 cP; and the cement slurry has a thickening time at 250° F. of greater than 6 hours and less than 65 hours.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "cement slurry" refers to a composition including a cement material that is mixed with at least water to form cement. The cement slurry may contain calcined alumina ($Al_2O_3$), silica ($SiO_2$), calcium oxide (CaO, also known as lime), iron oxide ($Fe_2O_3$), magnesium oxide (MgO), clay, sand, gravel, and mixtures thereof.

As used throughout this disclosure, the term "consistency" refers to a rheological property of matter related to the cohesion of the individual particles of a given material, its ability to deform and its resistance to flow. The consistency of cement slurries is determined by thickening time tests in accordance with API Recommended Practice 10B and is expressed in Bearden units of consistency (Bc), a dimensionless quantity with no direction conversion factor to more common units of viscosity. The Bearden units of consistency is measured on a scale from 1 to 100 where, conventionally, difficult pumping is thought to begin at 50 Bc, and cement is completely set at 100 Bc.

As used throughout this disclosure, the term "curing" refers to providing adequate moisture, temperature and time to allow the concrete to achieve the desired properties (such as hardness) for its intended use through one or more reactions between the water and the microtine cement material.

As used throughout this disclosure, the term "drying" refers to merely allowing the cement to achieve a moisture condition appropriate for its intended use, which may only involve physical state changes, as opposed to chemical reactions.

As used throughout this disclosure, the term "point of departure" refers to the beginning of thickening of a cement slurry during the thickening-time test, and is often abbreviated as POD. For some cement slurries, the POD is used as the thickening time.

As used throughout this disclosure, the term "retarder" refers to a chemical agent used to increase the thickening time of cement slurries to enable proper placement. The need for cement retardation increases with depth due to the greater time required to complete the cementing operation and the effect of increased temperature on the cement-setting process.

As used throughout this disclosure, the term "right angle set" refers to the characteristic of a cement slurry whose consistency changes from the point of departure, or from 30 Bc to 100 Bc, in a short time. The term refers to the characteristic 90-degree bend in a plot of cement consistency versus time.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a cement slurry remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bc.

As used throughout this disclosure, the term "wellbore" refers to the drilled hole or borehole, including the openhole or uncased portion of the well. Borehole may refer to the inside diameter of the wellbore wall, which is the rock face that bounds the drilled hole.

Embodiments of the present disclosure relate to cement slurries with improved retardation and without gelation issues. Embodiments of the present disclosure also relate to methods of producing and using cement slurries, in some particular embodiments, for use in the oil and gas industries.

Embodiments of the present disclosure relate to cement slurries with improved retardation and without gelation issues. The cement slurries of the present disclosure may be used in the oil and gas drilling industries, such as for cementing in oil and gas wells. Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

In some instances, a casing may be inserted into the wellbore. The casing may be a pipe or other tubular structure which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cement slurry properly harden into cured cement. If the cement slurry is not evenly placed or fluid is lost from the cement slurry before curing, the cement slurry may not evenly harden into a cured cement. Therefore, the viscosity, flowability, and thickening time of a cement slurry are important properties to ensure proper placement. Specifically, thickening time may be retarded by the use of retarder additives, creating more time for optimal placement of the cement before setting. Similarly, reducing fluid loss from the cement slurry ensures uniform hardening, as curing often involves water-based reactions with the cement slurry. Too much or too little water affects the hardness and, thus, the quality of the cured cement produced.

A number of conditions may impact the fluid loss of a cement slurry. For instance, water may be drawn from the slurry into the permeable subsurface formation, particularly if pumping ceases and the slurry becomes static without hardening. Water may also be lost due to displacement as the cement slurry is passed through constrictions, such as the tight clearance between a casing and an annulus, which may "squeeze" water from the slurry. Adverse weather and soil conditions may additionally impact the amount of water present in the cement slurry. As such, control of fluid loss of the cement slurry may allow for a more uniform and stronger cured cement.

The present disclosure provides cement slurries which may have, among other attributes, improved rheology and reduced fluid loss to address these concerns. The cement slurry of the present disclosure includes water, microfine cement material, and bisphenol-F diglycidyl ether resin. Without being bound by any particular theory, use of the microfine cement material along with the bisphenol-F diglycidyl ether resin in some embodiments may provide extended thickening time of the cement slurry to allow for easier processing, flowability, and handling of the cement slurry in various applications. Moreover, extending the thickening time will reduce the pumping pressure needed to pump and place cement into the well.

The microfine cement material may be any suitable material which, when mixed with water, can be cured into a cement. As used throughout this disclosure, the term "microfine cement" refers to particles having a specific surface area of less than 800 $m^2/kg$. In embodiments, the microfine cement may have a particle size of from 2 to 15 μm. The microfine cement material may be hydraulic or non-hydraulic. A hydraulic microfine cement material refers to a mixture of limestone, clay and gypsum burned together under extreme temperatures that may begin to harden instantly or within a few minutes while in contact with water. A non-hydraulic microfine cement material refers to a mixture of lime, gypsum, plasters and oxychloride. A non-hydraulic microfine cement may take longer to harden or may require drying conditions for proper strengthening, but often is more economically feasible. A hydraulic or non-hydraulic microfine cement material may be chosen based on the desired application of the cement slurry of the present disclosure. In some embodiments, the microfine cement material may be Portland microfine cement, such as Class G Portland Cement. Portland microfine cement is a hydraulic microfine cement material (microfine cement material that not only hardens by reacting with water but also forms a water-resistant product) produced by pulverizing clinkers, which contain hydraulic calcium silicates and one or more of the forms of calcium sulfate as an inter-ground addition. In other embodiments, the microfine cement material may be Saudi microfine cement, which is a combination of Portland microfine cement and crystalline silica. Crystalline silica is also known as quartz.

The microfine cement material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, calcium aluminate, silica sand, silica flour, hematite, manganese tetroxide, other similar compounds, and combinations of these. The microfine cement material may include Portland cement, siliceous fly ash, calcareous fly ash, slag cement, silica fume, quartz, any known microfine cement material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The microfine cement material of the cement slurry may include Saudi Class G cement. Saudi Class G cement may include from 60 to 100 weight percent (wt. %), from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 wt. % Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz. Saudi Class G cement may have a pH of greater than 7, of from 8 to 14, of from 10 to 13, of from 11 to 13, of from 12 to 13, or of 12.4. Saudi Class G cement may have a bulk density at 20° C. of from 70 to 120 pounds per cubic feet ($lb/ft^3$), of from 80 to 110 $lb/ft^3$, of from 90 to 100 $lb/ft^3$, or of 94 $lb/ft^3$. Saudi Class G cement may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

Water may be added to the microfine cement material to produce the slurry. The water may be distilled water, deionized water, or tap water. In some embodiments, the water may contain additives or contaminants. For instance, the water may include freshwater or seawater, natural or synthetic brine, formation water, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In some embodiments, the cement slurry may contain from 10 wt. % to 70 wt. % by weight of microfine cement (BWOC) water. In some embodiments, the cement slurry may contain from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The cement slurry may contain 30 wt. % BWOC water.

Along with the microfine cement material and water, the cement slurry includes bisphenol-F diglycidyl ether resin. The bisphenol-F diglycidyl ether resin functions as retarder additive, extending the thickening time of the cement slurry. Bisphenol-F diglycidyl ether resin may be synthesized by reacting bisphenol-F with excess amount of epichlorohydrin in present of an alkali hydroxide. The bisphenol-F diglycidyl ether resin may have a glass transition temperature ($T_g$) of from 250° F. to 400° F., from 250° F. to 350° F., from 250° F. to 325° F., from 250° F. to 310° F., from 250° F. to 305° F., from 250° F. to 300° F., from 275° F. to 400° F., from 275° F. to 350° F., from 275° F. to 325° F., from 275° F. to 310° F., from 275° F. to 305° F., from 275° F. to 300° F., from 290° F. to 400° F., from 290° F. to 350° F., from 290° F. to 325° F., from 290° F. to 310° F., from 290° F. to 305° F., from 290° F. to 300° F., from 295° F. to 400° F., from 295° F. to 350° F., from 295° F. to 325° F., from 295° F. to 310° F., from 295° F. to 305° F., or from 295° F. to 300° F. The cement slurry may include from 10 to 20 wt. %, from 10 to 18 wt. %, from 10 to 16 wt. %, from 10 to 15 wt. %, from 10 to 14 wt. %, from 10 to 12 wt. %, from 12 to 20 wt. %, from 12 to 18 wt. %, from 12 to 16 wt. %, from 12 to 15 wt. %, from 12 to 14 wt. %, from 14 to 20 wt. %, from 14 to 18 wt. %, from 14 to 16 wt. %, from 14 to 15 wt. %, from 15 to 20 wt. %, from 15 to 18 wt. %, from 15 to 16 wt. %, from 16 to 20 wt. %, from 16 to 18 wt. %, or from 18 to 20 wt. % BWOC bisphenol-F diglycidyl ether resin.

The cement slurry may further include manganese tetroxide ($Mn_3O_4$). The manganese tetroxide may function as a weighting agent within the cement slurry and increase the density of the cement slurry while maintaining the mixability of the fluid. The cement slurry may include from 40 to 60 wt. %, from 40 to 55 wt. %, from 40 to 50 wt. %, from 40 to 45 wt. %, from 45 to 60 wt. %, from 45 to 55 wt. %, from 45 to 50 wt. %, from 50 to 60 wt. %, from 50 to 55 wt. %, or from 55 to 60 wt. % BWOC manganese tetroxide.

The cement slurry may include from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 35 wt. %, from 35 to 50 wt. %, from 35 to 45 wt %, from 35 to 40 wt. %, from 40 to 50 wt. %, from 40 to 45 wt. %, or from 45 to 50 wt. % BWOC silica flour.

In some embodiments, the cement slurry may contain at least one additive other than or in addition to the previously described additives. As non-limiting examples, suitable additives may include accelerators, retarders, extenders, weighting agents, fluid loss control agents, lost circulation control agents, surfactants, antifoaming agents, elastomers, fibers, dispersants or combinations of these.

In some embodiments, the cement slurry may contain from 0.1 to 10 wt. % BWOC of the one or more additives based on the total weight of the cement slurry. For instance, the cement slurry may contain from 0.1 to 8 wt. % BWOC of the one or more additives, from 0.1 to 5 wt. % BWOC of the one or more additives, from 0.1 to 3 wt. % BWOC of the one or more additives, or from 0.2 to 0.5 wt. % BWOC of the one or more additives. The cement slurry may contain from 1 to 10 wt. % BWOC of the one or more additives, from 1 to 8 wt. % BWOC, from 1 to 5 wt. % BWOC, or from 1 to 3 wt. % BWOC of the one or more additives. In some embodiments, the cement slurry may contain from 3 to 5 wt. % BWOC, from 3 to 8 wt. % BWOC, from 3 to 10 wt. % BWOC, or from 5 to 10 wt. % BWOC of the one or more additives.

In some embodiments, the one or more additives may include a dispersant containing one or more anionic groups. The dispersant may include synthetic sulfonated polymers, lignosulfonates with carboxylate groups, organic acids, hydroxylated sugars, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the cement slurry and may, in some embodiments, cause additional retardation effects.

In some embodiments, the cement slurry may contain from 0.1 wt. % BWOC to 10 wt. % BWOC of one or more fluid loss additives, the one or more dispersants, or both. The cement slurry may contain from 0.02 to 90 pounds per barrel (lb/bbl) of the fluid loss additives, the one or more dispersants, or both based on the total weight of the cement slurry. For instance, the cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

The cement slurry may have a thickening time at 400° F. of from 1 to 100 hours, from 1 to 70 hours, from 1 to 65 hours, from 1 to 60 hours, from 1 to 40 hours, from 1 to 20 hours, from 1 to 15 hours, from 1 to 10 hours, from 1 to 5 hours, from 1 to 4 hours, from 1 to 2 hours, from 2 to 100 hours, from 2 to 70 hours, from 2 to 65 hours, from 2 to 60 hours, from 2 to 40 hours, from 2 to 20 hours, from 2 to 15 hours, from 2 to 10 hours, from 2 to 5 hours, from 2 to 4 hours, from 4 to 100 hours, from 4 to 70 hours, from 4 to 65 hours, from 4 to 60 hours, from 4 to 40 hours, from 4 to 20 hours, from 4 to 15 hours, from 4 to 10 hours, from 4 to 5 hours, from 5 to 100 hours, from 5 to 70 hours, from 5 to 65 hours, from 5 to 60 hours, from 5 to 40 hours, from 5 to 20 hours, from 5 to 15 hours, from 5 to 10 hours, from 5 to 8 hours, from 5 to 7 hours, from 5 to 6 hours, from 6 to 100 hours, from 6 to 70 hours, from 6 to 65 hours, from 6 to 60 hours, from 6 to 40 hours, from 6 to 20 hours, from 6 to 15 hours, from 6 to 10 hours, from 6 to 8 hours, from 6 to 7 hours, from 7 to 100 hours, from 7 to 70 hours, from 7 to 65 hours, from 7 to 60 hours, from 7 to 40 hours, from 7 to 20 hours, from 7 to 15 hours, from 7 to 10 hours, from 7 to 8 hours, from 8 to 100 hours, from 8 to 70 hours, from 8 to 65 hours, from 8 to 40 hours, from 8 to 20 hours, from 8 to 15 hours, or from 8 to 10 hours.

A thickening time test is used to simulate pumping conditions in order to determine a length of time before the cement becomes difficult or impossible to pump. The most common method to determine thickening time is via a pressurized consistometer. This device allows pressure and temperature to be applied to a cement slurry while it is being stirred (typically at 150 revolutions per minute (RPM)). A resistor arm on a potentiometer indicates resistance to the paddle turning as the cement sets. The apparatus is calibrated to a standard output in Bearden Consistency units. The device is fully automated and can simulate squeeze schedules or batch mixing, and may have variable speed motors for use in the dynamic settling test.

The cement slurries of the present disclosure may have a density of from 50 to 150 pound per cubic foot (pcf), from 50 to 125 pcf, from 50 to 105 pcf, from 50 to 100 pcf, from 50 to 95 pcf, from 75 to 150 pcf, from 75 to 125 pcf, from 75 to 105 pcf, from 75 to 100 pcf, from 75 to 95 pcf, from 85 to 150 pcf, from 85 to 125 pcf, from 85 to 105 pcf, from 85 to 100 pcf, from 85 to 95 pcf, from 90 to 150 pcf, from 90 to 125 pcf, from 90 to 105 pcf, from 90 to 100 pcf, from 90 to 95 pcf, from 95 to 150 pcf, from 95 to 125 pcf, from 95 to 105 pcf, from 95 to 100 pcf, from 100 to 150 pcf, from 100 to 125 pcf, or from 100 to 105 pcf.

The rheological behavior of the cement slurry may be determined by measuring the shear stress on the cement slurry at different shear rates, which may be accomplished by measuring the shear stress or shear rate on the cement slurry. The various shear rates are utilized as cement slurry behaves as a rigid body at lesser shear stresses but flows as a viscous fluid at greater shear stresses. The rheology of the cement slurry may be characterized by the plastic viscosity (PV) in centiPoise (cP) and the yield point (YP), which are parameters from the Bingham plastic rheology model. The PV is related to the resistance of the cement slurry to flow due to mechanical interaction between the solids of the cement slurry and represents the viscosity of the cement slurry extrapolated to infinite shear rate. The PV reflects the type and concentration of the solids in the cement slurry. The PV of a cement slurry may be estimated by measuring the shear stress of the cement slurry using the previously described rheometer at spindle speeds of 300 rotations per minute (RPM) and 600 RPM and subtracting the 300 RPM dial reading from the 600 RPM dial reading according to Equation 1:

$$PV(cP) = \text{(dial reading at 600 RPM)} - \text{(dial reading at 300 RPM)} \qquad \text{Equation 1}$$

The cement slurries of the present disclosure may have a PV of from 50 to 500 cP. In some embodiments, the cement slurry may have a PV of from 50 to 500 cP, from 50 to 350 cP, from 50 to 300 cP, from 50 to 275 cP, from 50 to 250 cP, from 50 to 225 cP, from 50 to 200 cP, from 50 to 150 cP, from 50 to 125 cP, from 75 to 500 cP, from 75 to 350 cP, from 75 to 300 cP, from 75 to 275 cP, from 75 to 250 cP, from 75 to 225 cP, from 75 to 200 cP, from 75 to 150 cP, from 75 to 125 cP, from 100 to 500 cP, from 100 to 350 cP, from 100 to 300 cP, from 100 to 275 cP, from 100 to 250 cP, from 100 to 225 cP, from 100 to 200 cP, from 100 to 150 cP, from 100 to 125 cP, from 125 to 500 cP, from 125 to 350 cP, from 125 to 300 cP, from 125 to 275 cP, from 125 to 250 cP, from 125 to 225 cP, from 125 to 200 cP, from 125 to 150 cP, from 150 to 500 cP, from 150 to 350 cP, from 150 to 300 cP, from 150 to 275 cP, from 150 to 250 cP, from 150 to 225 cP, from 150 to 200 cP, from 175 to 500 cP, from 175 to 350 cP, from 175 to 300 cP, from 175 to 275 cP, from 175 to 250 cP, from 175 to 225 cP, from 175 to 200 cP, from 200 to 500 cP, from 200 to 350 cP, from 200 to 300 cP, from 200 to 275 cP, from 200 to 250 cP, from 200 to 225 cP, from 225 to 500 cP, from 225 to 350 cP, from 225 to 300 cP, from 225 to 275 cP, or from 225 to 250 cP.

The cement slurry behaves as a rigid body when the shear stress is less than the YP, and the cement slurry flows as a viscous fluid when the shear stress is greater than the YP. In other words, the YP represents the amount of stress required to move the cement slurry from a static condition. The YP is expressed as a force per area, such as pounds of force per one hundred square feet ($lb_f/100\ ft^2$). YP provides an indication of the solids carrying capacity of the cement slurry through the annulus, which in simplified terms gives an indication of the cement slurry's hole-cleaning ability. A cement slurry having a YP of equal to or greater than 15 $lb_f/100\ ft^2$ is considered acceptable for drilling. The YP is determined by extrapolating the Bingham plastic rheology model to a shear rate of zero. The YP may be estimated from the PV (as measured in accordance with Equation 1, as previously described) according to Equation 2:

$$YP = (\text{dial reading at } 300\ RPM) - PV \qquad \text{Equation 2}$$

The cement slurries of the present disclosure may have a YP of from 0.5 to 50 $lb_f/100\ ft^2$. In some embodiments, the cement slurries of the present disclosure may have a YP of from 0.5 to 100 $lb_f/100\ ft^2$, from 0.5 to 60 $lb_f/100\ ft^2$, from 0.5 to 40 $lb_f/100\ ft^2$, from 0.5 to 30 $lb_f/100\ ft^2$, from 0.5 to 20 $lb_f/100\ ft^2$, from 0.5 to 15 $lb_f/100\ ft^2$, from 0.5 to 10 $lb_f/100\ ft^2$, from 0.5 to 5 $lb_f/100\ ft^2$, from 0.5 to 1 $lb_f/100\ ft^2$, from 1 to 100 $lb_f/100\ ft^2$, from 1 to 60 $lb_f/100\ ft^2$, from 1 to 50 $lb_f/100\ ft^2$, from 1 to 40 $lb_f/100\ ft^2$, from 1 to 30 $lb_f/100\ ft^2$, from 1 to 20 $lb_f/100\ ft^2$, from 1 to 15 $lb_f/100\ ft^2$, from 1 to 10 $lb_f/100\ ft^2$, from 1 to 5 $lb_f/100\ ft^2$, from 1 to 3 $lb_f/100\ ft^2$, from 1 to 2 $lb_f/100\ ft^2$, from 2 to 100 $lb_f/100\ ft^2$, from 2 to 60 $lb_f/100\ ft^2$, from 2 to 50 $lb_f/100\ ft^2$, from 2 to 40 $lb_f/100\ ft^2$, from 2 to 30 $lb_f/100\ ft^2$, from 2 to 20 $lb_f/100\ ft^2$, from 2 to 15 $lb_f/100\ ft^2$, from 2 to 10 $lb_f/100\ ft^2$, from 2 to 5 $lb_f/100\ ft^2$, from 2 to 3 $lb_f/100\ ft^2$, from 3 to 100 $lb_f/100\ ft^2$, from 3 to 60 $lb_f/100\ ft^2$, from 3 to 50 $lb_f/100\ ft^2$, from 3 to 40 $lb_f/100\ ft^2$, from 3 to 30 $lb_f/100\ ft^2$, from 3 to 20 $lb_f/100\ ft^2$, from 3 to 15 $lb_f/100\ ft^2$, from 3 to 10 $lb_f/100\ ft^2$, from 3 to 5 $lb_f/100\ ft^2$, from 5 to 100 $lb_f/100\ ft^2$, from 5 to 60 $lb_f/100\ ft^2$, from 5 to 50 $lb_f/100\ ft^2$, from 5 to 40 $lb_f/100\ ft^2$, from 5 to 30 $lb_f/100\ ft^2$, from 5 to 20 $lb_f/100\ ft^2$, from 5 to 15 $lb_f/100\ ft^2$, or from 5 to 10 $lb_f/100\ ft^2$.

Embodiments of the disclosure also relate to methods of producing the cement slurries previously described. In some embodiments, the method for producing a cement slurry may include mixing water with a microfine cement material and bisphenol-F diglycidyl ether resin to produce a cement slurry. The water, microfine cement material and bisphenol-F diglycidyl ether resin may be in accordance with any of the embodiments previously described. The cement slurry may include any of the components previously described.

The mixing step, in some embodiments, may involve shearing the water, microfine cement material, bisphenol-F diglycidyl ether resin, optionally, other additives at a suitable speed for a suitable period of time to form the cement slurry. In one embodiment, the mixing may be done in the lab using a standard API blender for 15 seconds at 4,000 RPM and 35 seconds at 12,000 RPM. The equation of mixing energy is:

$$\frac{E}{M} = \frac{k\omega^2 t}{V} \qquad \text{EQUATION 1}$$

where
E=Mixing energy (kJ)
M=Mass of slurry (kg)
k=$6.1 \times 10^{-8}$ $m^5/s$ (constant found experimentally)
∫=Rotational speed (radians/s)
t=Mixing time (s)
V=Slurry volume ($m^3$)

Further embodiments of the present disclosure relate to methods of using the cement slurries previously described. In some embodiments, the method may include pumping the cement slurry into a location to be cemented and curing the cement slurry by allowing the water and the microfine cement material to react. The location to be cemented may, for instance, be a well, a wellbore, an annulus, or other such locations.

Cementing is performed when the cement slurry is deployed into the well via pumps, displacing the drilling fluids located within the well, and replacing them with cement. The cement slurry flows to the bottom of the wellbore through the casing, which will eventually be the pipe through which the hydrocarbons flow to the surface. From there, the cement slurry fills in the space between the casing and the wellbore wall, and hardens. This creates a seal so that outside materials cannot enter the well flow, as well as permanently positions the casing in place. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before actually pumping the cement into the hole.

In some embodiments, curing the cement slurry may refer to passively allowing time to pass under suitable conditions upon which the cement slurry may harden or cure through allowing one or more reactions between the water and the microfine cement material. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the microfine cement, a combination of these, or other such means. Usually, the cement will be cured and convert from slurry to solid due to subsurface formation conditions, temperature, and pressure. In the laboratory, a curing chamber capable of applying temperature and pressure is used for curing the cement specimens at required conditions. Cubical molds (2"×2"×2") and cylindrical cells (1.4" diameter and 12" length) were lowered into the curing chamber. Pressures and temperatures were maintained until shortly before the end of the curing where they were reduced to ambient conditions.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., or greater than or equal to 120° F. The cement slurry may be cured at temperatures of from 50° F. to 250° F., or from 50° F. to 200° F., or from 50° F. to 150° F., or from 50° F. to 120° F. In some instances, the temperature may be as great as 500° F. The cement slurry may be cured for from 1 day to 14 days, such as from 3 to 14 days, or from 5 to 14 days, or from 7 to 14 days, or from 1 to 3 days, or from 3 to 7 days.

Further embodiments of the present disclosure relate to particular methods of cementing a casing in a wellbore. The method may include pumping a cement slurry into an annulus between a casing and a wellbore and curing the cement slurry. The cement slurry may be in accordance with any of the embodiments previously described. Likewise, curing the cement slurry may be in accordance with any of the embodiments previously described. As stated previously, cementing is performed when the cement slurry is deployed into the well via pumps, displacing the drilling fluids located within the well, and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

Embodiments of the disclosure also relate to methods of producing cured cements. The method may include combining water with a microfine cement material and bisphenol-F diglycidyl ether resin. The cement slurry may be in accordance with any of the embodiments previously described. The method may include curing the cement slurry by allowing for a reaction between the water and the microfine cement material to produce cured cement. The curing step may be in accordance with any of the embodiments previously described.

In some embodiments, cement is composed of four main components: tricalcium silicate ($Ca_3O_5Si$) which contributes to the early strength development; dicalcium silicate ($Ca_2SiO_4$), which contributes to the final strength, tricalcium aluminate ($Ca_3Al_2O_6$), which contributes to the early strength; and tetracalcium alumina ferrite. These phases are sometimes called alite and belite respectively. In addition, gypsum may be added to control the reactivity of tricalcium aluminate.

In one embodiment, the silicates phase in cement may be about 75-80 wt. % of the total material. $Ca_3O_5Si$ is the major constituent, with concentration ranging from 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate, commonly called CSH gel, has a variable C:S and H:S ratio depending on the temperature, calcium concentration in the aqueous phase, and the curing time. The CSH gel comprises +/−70 wt. % of fully hydrated Portland cement at ambient conditions and is considered the principal binder of hardened cement. Upon contact with water, the gypsum may partially dissolves releasing calcium and sulphate ions to react with the aluminate and hydroxyl ions to form a calcium trisulphoaluminate hydrate, known as the mineral ettringite ($Ca_6Al_2(SO_4)_3(OH)_{12}\cdot 26H_2O$) that will precipitate onto the $Ca_3O_5Si$ surfaces preventing further rapid hydration (flash-set). The gypsum is gradually consumed and ettringite continues to precipitate until the gypsum is consumed. The sulphates ion concentration will be drop down and the ettringite will become unstable converting to calcium monosulphoaluminate hydrate ($Ca_4Al_2O_6(SO_4)\cdot 14H_2O$). The remaining unhydrated $Ca_3O_5Si$ will form calcium aluminate hydrate. Cement slurry design is based on the altering or inhibition of the hydration reactions with specific additives.

The cured cement may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO\cdot Al_2O_3\cdot Fe_2O_3$), gypsum ($CaSO_4\cdot 2H_2O$) sodium oxide, potassium oxide, limestone, lime (calcium oxide), hexavalent chromium, calcium aluminate, other similar compounds, and combinations of these. The microfine cement material may include Portland cement, siliceous fly ash, calcareous fly ash, slag cement, silica fume, any known microfine cement material or combinations of any of these.

Without being bound by any particular theory, controlling the fluid loss and rheology properties of the cement slurry when producing the cured cement may result in a stronger, more stable cured cement, as previously discussed. In some embodiments, the cured cement of the present disclosure may have a compressive strength of from 400 to 5000 pounds per square inch (psi) in the compressive strength test conducted according to API recommended practice 10B-2. In the test, the set cement cubes were removed from the molds, and placed in a hydraulic press where increasing force was exerted on each cubes until failure. The hydraulic press system used in this study applied known compressive loads to the samples. This system was designed to test the compressive strength of sample cement cubes in compliance with API recommended practice 10B-2. The cured cements of the present disclosure may achieve a compressive strength of approximately 500 psi in less than 18 hours, less than 15 hours, less than 12 hours, less than 10 hours, less than 8 hours, or in less than 7 hours. The cured cements of the present disclosure may achieve a compressive strength of approximately 500 psi in from 5 to 18 hours, from 5 to 15 hours, from 5 to 12 hours, from 5 to 10 hours, from 5 to 8 hours, from 5 to 7 hours, from 6 to 18 hours, from 6 to 15 hours, from 6 to 12 hours, from 6 to 10 hours, from 6 to 8 hours, or from 6 to 7 hours.

In some embodiments, the cement slurry may contain water and may be water-based. As such, the cement slurry may by hydrophilic, forming stronger bonds with water-wet surfaces. Well sections drilled with non-aqueous drilling fluids may have oil-wet surfaces, resulting in poor bonding between the well and the cement slurry, as oil and water are not miscible. Poor bonding may lead to failed isolation and a buildup of unwanted casing-casing or tubing-casing annular pressure. Without being bound by theory, it is desirable to make the subsurface formation or casing water wet to enhance and improve the bonding between cement and casing and cement and subsurface formation. If the wettability of the subsurface formation or casing is oil wet not water wet then the bonding will fail and could result in small gap(s) or channel(s) between the cement and casing or the cement and subsurface formation thereby resulting in improper wellbore isolation. This improper wellbore isolation could lead to fluid or gas escaping from the well through this gas or channel.

EXAMPLES

Experiment 1

Two cement slurries were formed with the compositions shown in Tables 1 and 2. Table 1 shows the composition of Example 1, and Table 2 shows the composition of Example 2. Micro Matrix cement is available from Halliburton and includes calcium silicate (CAS Number 1344-95-2), calcium aluminate (CAS 12042-68-1), and crystalline silica (CAS 14808-60-7). SSA-1 is 200-mesh silica flour having a specific gravity of is 2.630 available from Halliburton which helps cement maintain low permeability and high compressive strength under high temperature (more than 230° F.). Micromax is available from Elekm and includes trimanganese tetraoxide (CAS No. 1317-35-7). D-Air 3000 L is a silicon-based defoamer available from Halliburton. HALAD-344 is a fluid loss additive including carboxymethyl hydroxyethyl cellulose (CMHEC) available from Halliburton able to perform at temperatures up to about 325° F.

HALAD-413 is a fluid loss additive including KCl water and CaCl2 available from Halliburton. HR-12 is a medium temperature retarder including polymer with hydro carboxylic acid group available from Halliburton. The chemical structure of HR-12 is shown below:

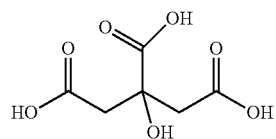 [SMILES: O=C(O)CC(O)(CC(=O)O)C(=O)O]

HR-25 is a higher temperature retarder based on organophosphates available from Halliburton. The chemical structure of HR-25 is shown below:

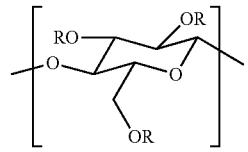

WellLock R3 includes diglycidylether of bisphenol-F epoxy resin and is available from Haliburton. WellLock H3 includes 1,3-Benzenediamine, 2-methyl-4,6-bis(methylthio) (CAS 104983-85-9) and is available from Halliburton.

TABLE 1

Composition of Example 1

| Conc | UOM | Cement/Additive | Sample Type | Sample Date | Lot No. | Cement Properties | | |
|---|---|---|---|---|---|---|---|---|
| 100 | % BWOC | Micro Matrix Cement | Lab | 6 Sep. 2018 | MFC16507EQ0518 | Slurry Density | 100.239 | lbm/ft3 |
|  |  |  |  |  |  | Slurry Yield | 1.775 | ft3/sack |
| 15.16 | gal/sack | Fresh Water | Lab | 7 Jul. 2018 |  | Water Requirement | 7.58 | gal/sack |
| 35 | % BWOC | SSA-1 (Silica Flour) - PB | Chemicals | 6 Sep. 2018 |  | Total Mix Fluid | 9.796 | gal/sack |
| 50 | % BWOC | MICROMAX (PB) | Chemicals | 2 Aug. 2018 | mx15430EM0516 |  |  |  |
| 0.03 | gps | D-Air 3000L | Chemicals | 8 Oct. 2018 | 230-046852 | Water Source |  |  |
| 1.5 | % BWOC | HALAD-344 (PH) | Chemicals | 4 Oct. 2018 | 181058 | Water Chloride |  |  |
| 2.5 | % BWOC | HALAD-413 (PH) | Chemicals | 16 Apr. 2018 | 71400 | Solids content | 26.0471% |  |
| 1 | % BWOC | HR-12 (PH) | Chemicals | 16 Apr. 2018 | 80 | Liquids content | 73.9529% |  |
| 0.05 | % BWOC | HR-25 (PH) | Chemicals | 16 Apr. 2018 | 170625 |  |  |  |
| 29.81 | % BWOC | WellLock R3 | Chemicals | 6 Sep. 2018 |  |  |  |  |
| 9.51 | % BWOC | WellLock H3 | Chemicals | 28 Aug. 2018 | 4S106903201 |  |  |  |

TABLE 2

Composition of Example 2

| Conc | UOM | Cement/Additive | Sample Type | Sample Date | Lot No. | Cement Properties | | |
|---|---|---|---|---|---|---|---|---|
| 100 | % BWOC | Micro Matrix Cement | Lab | 6 Sep. 2018 | MFC16507EQ0518 | Slurry Density | 92.534 | lbm/ft3 |
|  |  |  |  |  |  | Slurry Yield | 1.56 | ft3/sack |
| 13.49 | gal/sack | Fresh Water | Lab | 7 Jul. 2018 |  | Water Requirement | 6.75 | gal/sack |
| 35 | % BWOC | SSA-1 (Silica Flour) - PB | Chemicals | 6 Sep. 2018 |  | Total Mix Fluid | 8.84 | gal/sack |
| 0.03 | gps | D-Air 3000L | Chemicals | 8 Oct. 2018 | 230-046858 |  |  |  |
| 1.5 | % BWOC | HALAD-344 (PH) | Chemicals | 4 Oct. 2018 | 181058 |  |  |  |
| 2.5 | % BWOC | HALAD-413 (PH) | Chemicals | 16 Apr. 2018 | 71400 | Water Source |  |  |
| 1 | % BWOC | HR-12 (PH) | Chemicals | 16 Apr. 2018 | 80 | Water Chloride |  |  |
| 0.05 | % BWOC | HR-25 (PH) | Chemicals | 16 Apr. 2018 | 170625 | Solids content | 24.29% |  |
| 28 | % BWOC | WellLock R3 | Chemicals | 6 Sep. 2018 |  | Liquids content | 75.71% |  |
| 8.9 | % BWOC | WellLock H3 | Chemicals | 28 Aug. 2018 | 4S106803201 |  |  |  |

Table 3 shows the laboratory tests results of Example 1 and Example 2. The densities of Example 1 and Example 2 are 100.2 PCF and 92.5 PCF, respectively. Example 1 included 50% BWOC manganese tetroxide, whereas Example 2 did not include manganese tetroxide. The Ultrasonic Cement Analyzer (UCA) test was conducted on both formulations to measure the time needed to reach the minimum required compressive strength of 500 psi. Example 1 needed 18 hours and 43 minutes to reach the desired compressive strength. Example 2 reached the 500 psi mark after 6 hours and 22 minutes. The API crush test results are shown in Table 3:

TABLE 3

| Description | Density (pcf) | UCA (500 psi) | API crush @ 12 hours |
|---|---|---|---|
| Example 1 (85% MMC + 15% WellLock R3 and WellLock H3) | 100.23 | 18:43 | 525.00 |
| Example 2 (85% MMC + 15% Resin) | 92.53 | 6:22 | 550.00 |

Example 1 reached the 100 BC mark (i.e. exhibited a thickening time) at 7 hours and 51 minutes, whereas Example 2 exhibited a thickening time of 5 hours and 46 minutes for the second formulation. Both compositions exceeded the 3 hours mark that commercial slurries are unable to exceed. Both tests were conducted under a pressure of 8,700 psi and a temperature of 250° F. and were batch mixed for a duration of 30 minutes.

| Job Type | Squeez | Ramp Time | 30 min |
|---|---|---|---|
| Thickening Time | 40 BC @ 3:31 | BC Final | 100 BC |
|  | 60 BC @ 3:44 |  |  |
|  | 100 BC @ 3:50 |  |  |
| Batch Mix | 30 min | Final Pressure | 5700 psi |
| BHST | 260° F. | Depth | 12000 ft |
| BHCT | 223° F. | Test Temp. | 223° F. |

| 100 gm Formulation | Grams |
|---|---|
| Resin (1) 2254 | 100 |
| Resin (2) 7106 | 0 |
| TEPA | 3 |

The API fluid loss and the rheology of Example 1 and Example 2 were conducted in a temperature of 190° F., and the API fluid loss test applied a pressure of 1,000 psi. Example 1 had an API fluid loss of 46 cc/30 minutes and Example 2 had an API fluid loss of 32 cc/30 minutes. Example 1 had a plastic viscosity of 240.63 cP and a yield point of 5.32 $lb_f/100\ ft^2$ and Example 2 had a plastic viscosity of 136.37 cP and a yield point of 1.49 $lb_f/100\ ft^2$.

Lastly, shear bond testing was conducted on Example 1. A force of 527 pound-force (lbf) was needed to break the shear bond and remove the inner pipe from the sample. This is a strong indicator that the addition of resin significantly enhances the shear bond between the cement and the drillpipe or casing.

Experiment 2

Two resin formulations were tested to compare the performance of 1) bisphenol-A/epichlorohydrin and butyl glycidyl ether and cyclohexanedimethanol resins cured with polyoxypropylene diamine and 2) diglycidylether of bisphenol-F epoxy resin. The bisphenol-A/epichlorohydrin and butyl glycidyl ether and cyclohexanedimethanol resins cured with polyoxypropylene diamine was Comparative Resin A, and the diglycidylether of bisphenol-F epoxy resin was Example Resin 1.

The samples were analyzed using TGA Q500 (TA) Thermal Gravimetric Analyzer that was programmed at a heating rate of 20° C./min under nitrogen atmospheres and under ambient pressure. Dynamic TGA measurements performed between 25-900° C. with heating rate of 20° C./min. Isothermal degradation rates were measured by using powder resins at three different temperatures ranging from 300 to 699.8° F. for 3000 minutes to monitor the percentages of weight loss until a minimum of 25% mass loss has occurred and around 5 mg of drilled samples in powder form had been used.

The glass transition temperatures ($T_g$) were then determined for each resin. Comparative Resin A had a $T_g$ of 248.9° F., and Example Resin 1 had a $T_g$ of 296.8° F. The greater $T_g$ of the diglycidylether of bisphenol-f epoxy resin is desirable, because the greater $T_g$ means the resin can be placed at greater depth that is associated with greater temperatures.

Degradation measurements by TGA showed that isothermal temperatures were reached in less than ½ hour. The values on the TGA thermograms show the remaining weight values of the sample at the mentioned temperature. These values also tabulated in Table 4 as weight loss (%) (100−residue=weight loss) values after 5, 10, 20 and 50 hours.

TABLE 4

Summary of TGA and DSC Results

| Sample Name | Tg(° C.) | Tg (° F.) | Weight Loss after 5 hr (%) | Weight Loss after 10 hr (%) | Weight Loss after 20 hr (%) | Weight Loss after 50 hr (%) | T (° C.) |
|---|---|---|---|---|---|---|---|
| Comparative Resin A | 120.5 | 249 | 1.05 | 1.13 | 1.23 | 1.36 | 121.5 (Tg + 1° C.) |
|  |  |  | 1.59 | 1.84 | 2.18 | * | 149 |
|  |  |  | 16.30 | 26.25 | 37.68 | 49.27 | 260 |
|  |  |  | 90.07 | 90.42 | 90.66 | 91.05 | 371 |
| Example Resin 1 | 147.5 | 295 | 0.94 | 1.02 | 1.1 | 1.09 | 149 |
|  |  |  | 8.29 | 15.85 | 29.49 | 48.54 | 260 |
|  |  |  | 81.51 | 81.87 | 82.23 | 82.63 | 371 |

At $(T_g+1)°$ C. and 149° C., weight losses are smaller (around 1-2%) for both resins (Table 4). At 260° C. and 371° C., weight losses are greater than at 149° C. which shows its stability at 149° C. These weight loss values are more predominant for at 260° C. and 371° C. The weight loss values reach more than 90% after 5 hours at 371° C. for Comparative Resin A. For Example Resin 1, the isothermal run was not performed at (Tg+1° C.) since minimum applied isothermal temperature (148.1° C.) is very close to 149° C. and the weight loss was determined to be 1.09%. After 20 hours, the samples lost 2.18% and 1.1%, of their original weights at 149° C. and 37.68% and 29.49% at 260° C. for Comparative Resin A and Example Resin 1, respectively, showing that Example Resin 1 exhibited less weight loss than Comparative Resin A at both temperatures.

The following description of the embodiments is illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A cement slurry comprising:
   water;
   microfine cement material having a specific surface area of less than 800 m²/kg, a particle size of from 2 μm to 15 μm, or both; and
   from 10 to 20 wt. % by weight of cement (BWOC) resin, the resin consisting of bisphenol-F diglycidyl ether resin and having a glass transition temperature of from 290° F. to 400° F.

2. The cement slurry of claim 1, further comprising manganese tetroxide.

3. The cement slurry of claim 2, wherein the cement slurry comprises from 40 to 60 wt. % by weight of cement (BWOC) manganese tetroxide.

4. The cement slurry of claim 1, wherein the cement slurry further comprises silica flour.

5. The cement slurry of claim 4, wherein the cement slurry comprises from 25 to 50 wt. % by weight of cement (BWOC) silica flour.

6. The cement slurry of claim 1, wherein the cement slurry comprises one or more components selected from the group consisting of an antifoam agent, a fluid loss additive, a temperature control additive, a dispersant, and a retarder.

7. The cement slurry of claim 1, further comprising a dispersant wherein the cement slurry comprises from 0.2 to 0.5 wt. % by weight of cement (BWOC) dispersant.

8. The cement slurry of claim 1, further comprising a retarder wherein the cement slurry comprises from 0.05 to 1.0 wt. % by weight of cement (BWOC) retarder.

9. The cement slurry of claim 1, further comprising a temperature control additive wherein the cement slurry comprises from 25 to 50 wt. % by weight of cement (BWOC) temperature control additive.

10. The cement slurry of claim 1, further comprising a fluid loss additive wherein the cement slurry comprises from 1 to 5 wt. % by weight of cement (BWOC) fluid loss additive.

11. The cement slurry of claim 1, wherein the cement slurry has a API fluid loss of less than 50 cc/30 minutes at 190° F.

12. The cement slurry of claim 1, wherein the cement slurry has a viscosity at 300 rpm and 190° F. of greater than 20 cP and less than 45 cP.

13. The cement slurry of claim 1, wherein the cement slurry has a thickening time at 250° F. of greater than 6 hours and less than 65 hours.

14. The cement slurry of claim 1, wherein the cement slurry comprises:
   from 40 to 60 wt. % BWOC manganese tetroxide;
   from 25 to 50 wt. % BWOC silica flour;
   from 0.2 to 0.5 wt. % BWOC dispersant;
   from 0.05 to 1.0 wt. % BWOC retarder;
   from 25 to 50 wt. % BWOC temperature control additive; and
   from 1 to 5 wt. % BWOC fluid loss additive.

15. A method of cementing a wellbore, comprising:
   pumping the cement slurry of claim 1 into a location to be cemented; and
   curing the cement slurry by allowing the water and the microfine cement material to react.

16. The method of claim 15, wherein the cement slurry has a API fluid loss of less than 50 cc/30 minutes at 190° F.

17. The method of claim 15, wherein the cement slurry has a viscosity at 300 rpm and 190° F. of greater than 20 cP and less than 45 cP.

18. The method of claim 15, wherein the cement slurry has a thickening time at 250° F. of greater than 6 hours and less than 65 hours.

19. The method of claim 15, wherein the cement slurry comprises:
   from 40 to 60 wt. % BWOC manganese tetroxide;
   from 25 to 50 wt. % BWOC silica flour;
   from 0.2 to 0.5 wt. % BWOC dispersant;
   from 0.05 to 1.0 wt. % BWOC retarder;
   from 25 to 50 wt. % BWOC temperature control additive;
   from 1 to 5 wt. % BWOC fluid loss additive; or
   combinations thereof.

20. A cement slurry comprising:
water,
microfine cement material having a specific surface area of less than 800 m²/kg, a particle size of from 2 μm to 15 μm, or both,
from 10 to 20 wt. % by weight of cement (BWOC) resin, the resin consisting of bisphenol-F diglycidyl ether resin and having a glass transition temperature of from 290° F. to 400° F.,
from 40 to 60 wt. % BWOC manganese tetroxide,
from 25 to 50 wt. % BWOC silica flour,
from 0.2 to 0.5 wt. % BWOC dispersant,
from 0.05 to 1.0 wt. % BWOC retarder,
from 25 to 50 wt. % BWOC temperature control additive, and
from 1 to 5 wt. % BWOC fluid loss additive; wherein:
   the cement slurry has a API fluid loss of less than 50 cc/30 minutes at 190° F.;
   the cement slurry has a viscosity at 300 rpm and 190° F. of greater than 20 cP and less than 45 cP; and
   the cement slurry has a thickening time at 250° F. of greater than 6 hours and less than 65 hours.

\* \* \* \* \*